(12) United States Patent
Nakai

(10) Patent No.: US 6,382,887 B1
(45) Date of Patent: May 7, 2002

(54) NOZZLE FOR LIQUID COOLANT IN A MACHINE TOOL

(75) Inventor: Yoshikazu Nakai, Sakai (JP)

(73) Assignee: Zeta Heiwa Ltd., Hyogo (JP)

(*) Notice: Subject to any disclaimer, the term of this patent is extended or adjusted under 35 U.S.C. 154(b) by 0 days.

(21) Appl. No.: 09/623,077

(22) PCT Filed: Dec. 28, 1998

(86) PCT No.: PCT/JP98/05997

§ 371 Date: Aug. 25, 2000

§ 102(e) Date: Aug. 25, 2000

(87) PCT Pub. No.: WO00/40366

PCT Pub. Date: Jul. 13, 2000

(51) Int. Cl.$^7$ ............................................. B23Q 11/10
(52) U.S. Cl. ............................... 409/136; 29/DIG. 50; 210/168; 210/171; 407/11; 408/56; 408/61
(58) Field of Search .................................. 409/135, 136, 409/137; 408/56, 61, 67; 407/11; 451/449, 453; 29/DIG. 50, DIG. 61, DIG. 63, DIG. 77, DIG. 88, DIG. 91; 210/168, 171, 255; 222/80, 566, 630

(56) References Cited

U.S. PATENT DOCUMENTS

| | | | | |
|---|---|---|---|---|
| 4,778,315 A | * | 10/1988 | Duffy et al. | 409/136 |
| 4,798,505 A | * | 1/1989 | Ameseder | 409/136 |
| 5,245,152 A | * | 9/1993 | McCall | 409/134 |
| 5,332,343 A | * | 7/1994 | Watanabe et al. | 409/136 |
| 6,036,412 A | * | 3/2000 | Dalla | 409/136 |
| 6,071,047 A | * | 6/2000 | Nakai | 409/136 |

FOREIGN PATENT DOCUMENTS

| | | |
|---|---|---|
| JP | 64-56940 | 10/1989 |
| JP | 4-176537 | 6/1992 |
| JP | 7-51981 | 2/1995 |
| JP | 7-25007 | 3/1995 |

* cited by examiner

*Primary Examiner*—Daniel W. Howell
(74) *Attorney, Agent, or Firm*—Kirschstein, et al.

(57) ABSTRACT

A frame-like nozzle for liquid coolant disposed above a machining tool is connected to a vertical main shaft. The nozzle is coaxial with the main shaft and directed downward. The nozzle has an inner peripheral wall, an inner flange formed in or close to the inner peripheral wall, an upper framework having a ceiling serving as a guide surface, and a lower framework. The liquid coolant flows upwardly out from the inside channel in a planar radial manner. The upper framework has an outer peripheral wall serving as an outside guide surface for downwardly bending the liquid and cooperating with the flange to define an outside channel. A flow agitating recess is formed in the wall surface. The lower framework includes a level difference, and forms a floor by which the coolant reaching the lower end of the outer peripheral wall is guided radially inward through the difference. Coolant is allowed to flow downward. The inner edge of the floor defines a circulatory waterfall opening.

5 Claims, 8 Drawing Sheets

NOZZLE FOR LIQUID COOLANT IN A MACHINE TOOL

TECHNICAL FIELD

The present invention relates to a liquid coolant feeding apparatus in a machine tool, such as a cutting machine or grinding machine, particularly to a nozzle for feeding a liquid coolant to a place of contact between a cutter or the like and a workpiece.

BACKGROUND ART

In a machining operation, a major factor for minimizing the machining time and machining-induced strain is to enhance contact lubrication between a cutting edge or grinding tool and a workpiece, and frictional heat dissipation or cooling. More specifically, from the viewpoint that the cutting conditions can be improved by imparting a slight amount of superficial weakening, it follows that a liquid coolant, if allowed to enter the main shearing region for cutting from all directions and adsorbed by the generated microscopic cracks or air gaps, would lower the surface energy to prevent re-adhesion. Such brittleness effect in shearing regions is very useful in that it increases the shearing angle, decreases the thickness of chips and saves the cutting force. On the other hand, since a tool will repetitively transiently form fields of plastic deformation and shearing in the surface of a workpiece, it is of the utmost importance that effective cooling and lubrication be effected for each of the transient fields of plastic deformation-and shearing which such tool contacts.

However, in conventional machine tools, a liquid coolant which is directly fed to such transient fields (tool contact regions) through a nozzle is slung by the rotation of the tool or workpiece and only superficially makes light contact with the surface of the tool and workpiece, so that it cannot be said to be contributing to effective cooling or lubrication.

DISCLOSURE OF THE INVENTION

In order to allow a liquid coolant in a machine tool to travel its way until it reaches the tool/workpiece contact region, where it forms a film, with satisfactory fluidity and against the centrifugal force from the rotating surface so as to successfully enter the shearing region, I have experimentally created and inspected the states of the various phases of the liquid coolant.

As a result, I have found that to amply feed a liquid coolant to a machining region, this can be achieved, not by directly injecting said liquid from a nozzle to the machining region, but by feeding it as a flow thereto. I have designed a nozzle for this object such that the nozzle, in the interior thereof, forms a liquid coolant into a group of fine turbulent flows and delivers it as a substantially cylindrical or conical veil-like waterfall around a rotating tool, with the lower end of said waterfall striking the circulatory line region on the workpiece surrounding the machining region, it being observed that the greater part of the liquid coolant reaching the circulatory line region moves as if creeping to the central portion including the rotating tool.

In the early stages of the designing of nozzles based on this finding, thinking that a waterfall-like veil of liquid coolant, which was helically rotating, surrounding the machining region struck the workpiece surface and then formed a radially inwardly directed helical flow arriving at the contact surfaces of the tool and the workpiece in the machining region and also at its vicinity, I constructed an annular nozzle adapted to discharge a liquid coolant, which was helically rotating, through a downwardly directed circumferential nozzle port, and filed this for international patent application (PCT/JP/97/00373, International Publication No. WO97/29882).

Although this nozzle construction of said 97/373 international patent application, as compared with the conventional simple nozzle construction, provides epoch-making machining speed, finish precision, and remarkable labor and energy saving, my further detailed study of the behavior of the waterfall-like veil of liquid coolant subsequent to its striking the workpiece surface has made me realize that there is room for further improvement of the feeding so method. More specifically, the lower end of the veil of liquid coolant striking the workpiece surface has a considerable portion thereof changed into an outward helical flow by centrifugal force, the remainder, which is about 50–60% of the total flow, being an inward helical flow, which forms a thickness of about 20 mm on the workpiece surface. In this case, even if the flow rate is increased using the same nozzle, the amount of the inward helical flow will remain unchanged since the centrifugal force is further increased.

Such inward helical flow, when reaching the center and striking the rotating tool, still has its large portion, though smaller than in the case of the conventional one-port nozzle, flown in all directions, during which time it is impossible to prevent chips from being somewhat caught in the tool/workpiece contact region which forms an air gap. Therefore, it can be safely assumed that if the liquid coolant is allowed, in large measure, to enter the veil from the lower end thereof, it is possible to envelop the rotating tool at the center of the thickened inward helical flow and cause the chips from the workpiece to float to the upper region in the center of the helical flow.

On the other hand, the centrifugal force of the veil of liquid coolant can be reduced by eliminating the helical rotation. Thus, if a nozzle construction, which is designed to discharge a liquid coolant downward through its circulatory nozzle port without a circumferential twist angle, is used it follows that a foreign substance clogging in the nozzle port or thereabouts would result in the liquid veil which is formed of discharged liquid coolant reaching the workpiece surface with a cut or slit formed from the clogging in the veil. (In this respect, if the liquid veil is helically rotating, the slit will disappear due to a mixable helical current in the nozzle construction or immediately below the nozzle port.) Therefore, an object of the present invention is to provide a nozzle construction designed so that even if a waterfall-like veil of discharged liquid coolant is helically rotating, the nozzle decreases the centrifugal force to ensure that the greater part of the liquid coolant reaching a workpiece's surface is directed to the center.

To achieve the above object, the present invention provides an annular or polygonal frame-like nozzle for liquid coolant adapted to be installed above a cutter edge such as a milling tool, grinding tool or drill fixed on a vertical main shaft with said nozzle being disposed coaxially with said main shaft and being directed downward, said nozzle comprising a) an inner peripheral wall, b) an inner flange for an inside channel support composed of a corridor by which a liquid coolant flowing in through an inlet formed directly in said inner peripheral wall or adjacent thereto is allowed to flow substantially radially, an intermediate peripheral wall extending upward from the outer edge of said corridor to cause said radially flowing liquid to make an inward turn, and a turnaround ceiling plate having an inner peripheral edge opposed to the periphery of said inner peripheral wall so as to form an opening through which said inwardly turned flowing liquid flows out upward along said inner
peripheral wall, c) an upper framework composed of a ceiling formed above said ceiling plate to serve as a guide surface which causes the liquid coolant flowing out upward through said opening to flow in a planar radial manner, and an outer peripheral wall serving as an outer guide surface which causes said planar radial flowing liquid to turn downward and flow downward in the periphery of said flange, said upper framework cooperating with the outer wall surface of said flange to form an outside channel, wherein the wall surface which forms said outside channel is formed at least one place therein with a recess or an uneven surface for agitating the flow, d) a lower floor including an outer peripheral edge and an inner peripheral edge which are connected to the lower end of said outer peripheral wall positioned below the level of said inner flange, at least one difference in level located intermediate between said inner and outer peripheral edges, said lower floor forming a flow guide floor by which the liquid coolant which has reached the lower end of said outer peripheral wall is guided radially inwardly through said difference in level, wherein e) the liquid coolant is caused to flow downward with the inner peripheral edge of said flow guide floor used as a circulatory waterfall discharging edge so as to form a waterfall-like liquid coolant veil which surrounds said cutter.

According to the above arrangement, the liquid coolant flow moves from the inside channel to the outside channel of the nozzle structure, said channels having a trap or hook construction whereby the liquid coolant flow is formed into a fine turbulent current or a particulate current, moving through the fluid guide floor and falling for discharge through the inner peripheral edge thereof (nozzle port)

In this case, the liquid coolant flow has its velocity (including rotating speed) decreased by the level difference in the fluid guide floor to have an increased thickness, so that the discharged liquid flow from the nozzle port is effectively pushed (radially inwardly) by the thick flow from behind, falling onto the workpiece surface while decreasing the veil diameter according to the flow rate, and moving mostly toward the center; thus, there is formed a central liquid layer which sufficiently covers the tool, as described above.

BRIEF DESCRIPTION OF THE DRAWINGS

FIG. 11 comprises (A) a schematic plan view and (B) a longitudinally sectional view showing a processed piece having thin side and bottom walls hollowed out as a result of the use of a liquid coolant nozzle according to the invention.

BEST MODE FOR EMBODYING THE INVENTION

Figure 1:
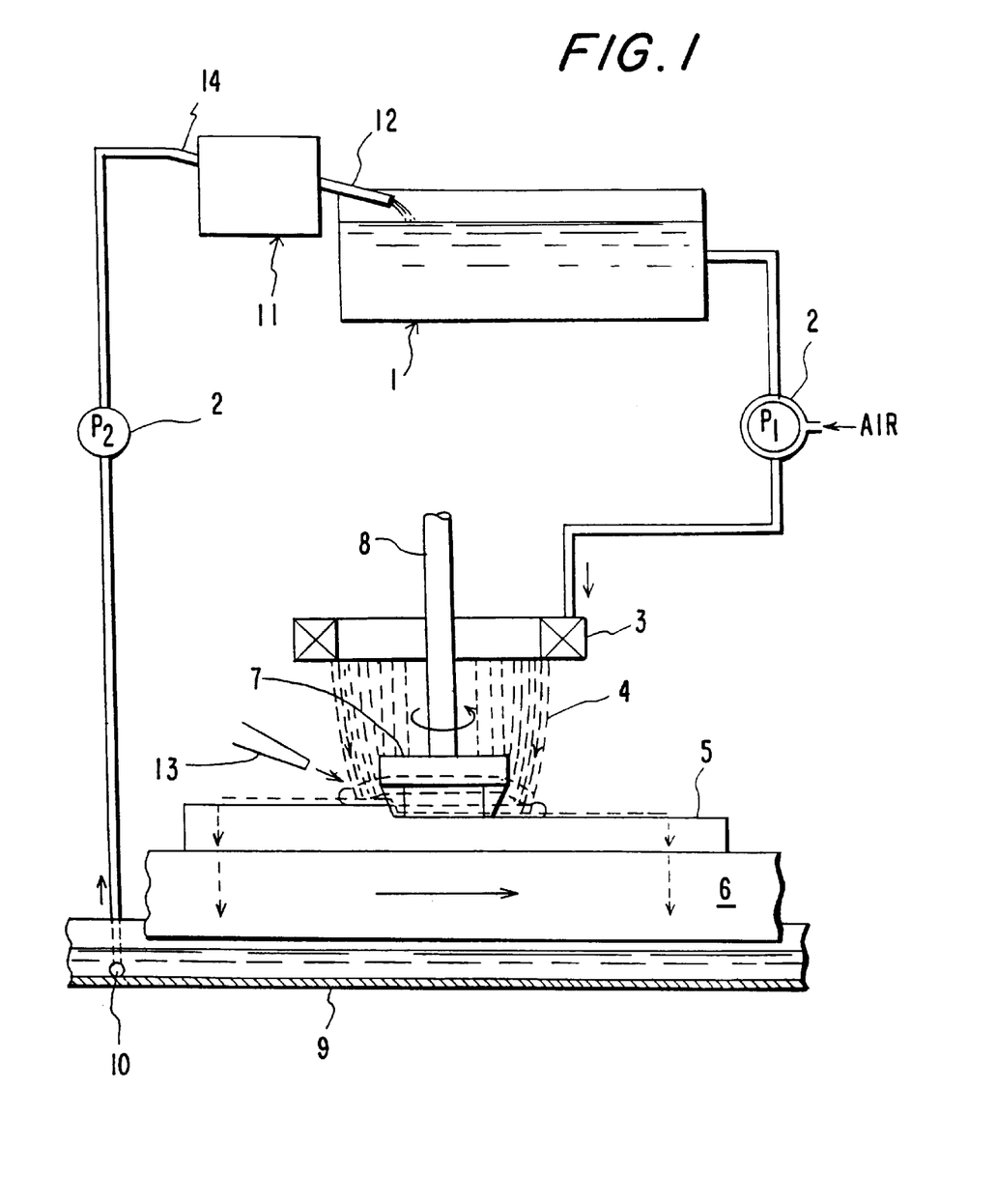
FIG. 1 is a schematic view showing the principle of constructing a liquid coolant circulation feed system using a liquid coolant nozzle for machine tools according to the present invention.

In FIG. 1 showing the basic arrangement of a liquid coolant circulation feed system in a machine tool according to the invention, the numeral 1 denotes a main tank of large capacity for a liquid coolant; 2 denotes a coolant pump P which, in this case, feeds a liquid coolant having bubbles introduced thereinto by an air gripping action to an annular nozzle 3. The liquid coolant nozzle 3 is, e.g., annular, and is so designed that a liquid coolant fed from a pump $p_1$ to be later described flows downward into an waterfall as a cylindrical or inverted frustoconical surrounding veil 4 of helical currents which are an aggregation of fine turbulent currents preferably having a slight twist angle, thus striking the surface of a workpiece 5. On a movable table 6, the workpiece 5 is cut by a milling tool 7 comprising a full-back cutter, and a main shaft 8 which supports the milling tool 7 extends through the axis of the annular nozzle 3. The surrounding veil 4 of liquid coolant is directed, at its lower end striking the surface of the workpiece, toward the center, mostly in the form of a surface current moving radially inwardly, providing an efficient supply to the place of contact (machining region) between the milling tool 7 and the workpiece 5. The liquid coolant thus fed to the machining region and forming a liquid layer bulged within the surrounding veil sets chips afloat from the machining region and flows therewith out of the surrounding veil 4, joining the partial liquid coolant flow which is initially directed outward, moving over the workpiece 5 and the movable table 6 and, in this case, into a gutter-like outer peripheral pan 9, then pumped up through a suction port 10 by a second coolant pump 2' ($p_2$), finally reaching a separating and recovering tank 11. For details of this separating and recovering pump 11, refer to said international patent application (PCT/JP/97/00373). In this tank 11, said liquid coolant has its foreign substances, such as oily components and chips, separated and removed therefrom, and then it is returned to said large capacity tank 1 through a spout 12. At one point in the lower end of the liquid coolant veil 4, a linear liquid coolant spout flow may be fed thereto from a place adjacent thereto as desired, thereby enhancing drainage after the liquid veil 4 has completed its task. The numeral 13 denotes an auxiliary nozzle therefor.

In the example of the arrangement of the liquid coolant circulating feed system described above, the liquid coolant to be fed as the surrounding veil 4 may desirably has bubbles introduced thereinto by the air gripping action of the coolant pump 2. In this case, the liquid coolant fed to the region of contact between the milling tool 7 and the workpiece 5 has a small mass and hence the centrifugal force it receives from the rotation of the tool is low, which means that its permeation into the tool/workpiece contact region is easy; in this case, splashes produced by the bursting of the bubbles are accelerated for easy permeation into microscopic cracks. Further, the heat dissipation effected by the bursting of the bubbles is also excellent, and the lubrication, heat dissipation, and cooling enhance the cutting function of the tool, as described above, making it possible to effect cutting with high feed rate by using a carbide tool. As a matter of course, the heat of cutting is continuously removed by the flow of liquid coolant discharged from the machining region. In addition, the operation for introducing bubbles into the liquid coolant is effected not only by the air gripping action of the pump 2 but also by the shock of pouring effected, for example, by sufficiently increasing the fall from the spout 14 of the recovery pipe to the separating and recovering tank 11 to the liquid level of said tank 11, and the fall from the spout 12 at the exit from the separating and recovering tank 11 to the liquid level of the large capacity tank 1.

Figure 2:
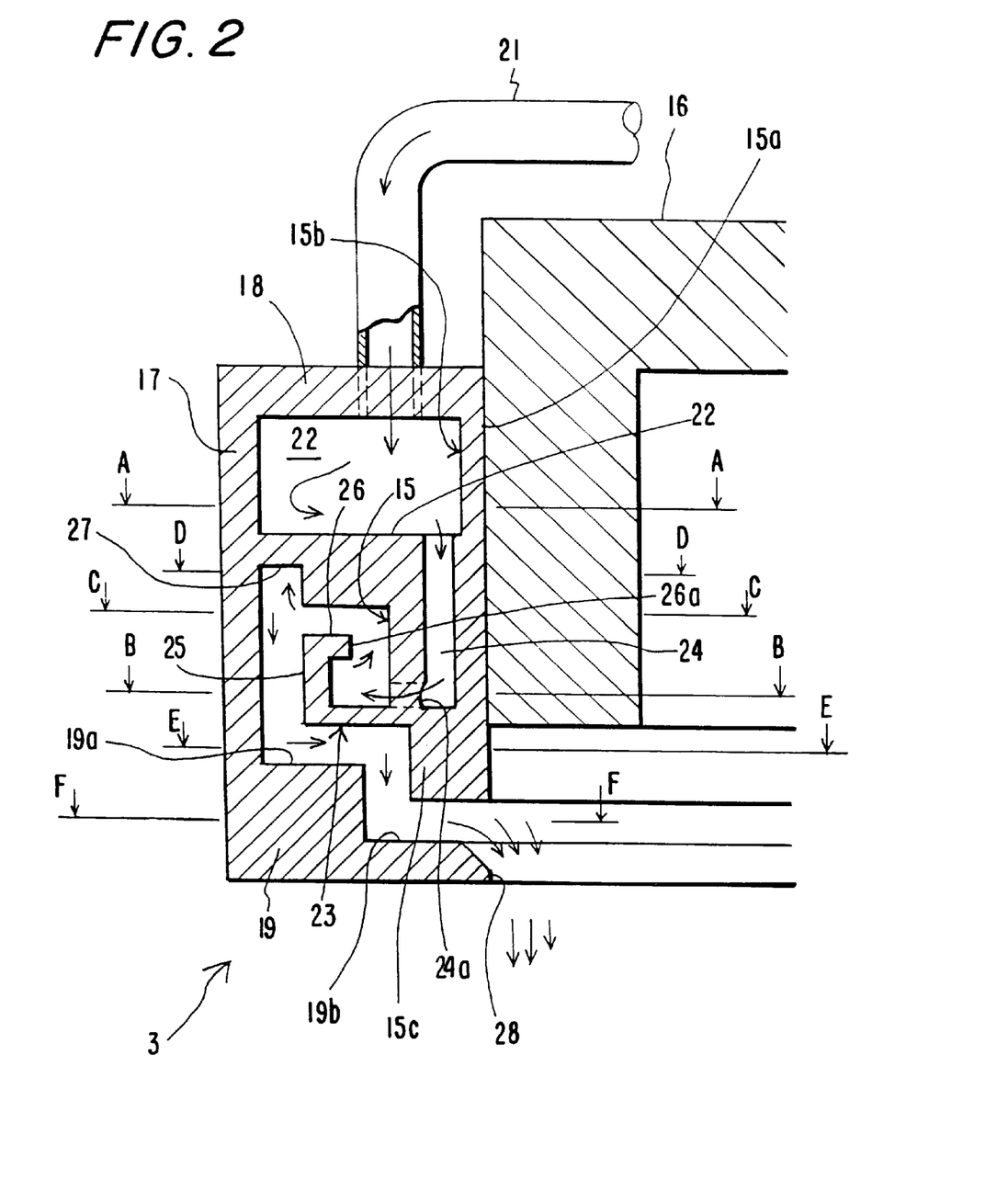
FIG. 2 is a fragmentary sectional view showing the sectional construction of a liquid coolant nozzle according to the basic embodiment of the invention.

FIG. 2 shows in detail the sectional construction in the basic embodiment of the annular nozzle 3 for liquid coolant. In this case, the main portion of the open inner peripheral surface 15a of the annular nozzle 3 is supported on the outer peripheral surface of the main shaft cover 16 of the machine. The annular nozzle 3 comprises an inner peripheral wall 15 having said open inner peripheral surface 15a; and an annular structure of metal surrounded by said inner peripheral wall 15, an outer peripheral wall 17, a top wall 17 and a lower frame wall 19. A space between the relatively thin upper portion 15b of the inner peripheral wall 15 and the outer peripheral wall 17 immediately below the top wall 18 provides an inlet chamber 20 for the liquid coolant, it being arranged that the liquid coolant from said pump 2 is fed into said chamber 20 through an inlet conduit 21 connected to the top wall 18.

An upper floor 22 which provides the bottom surface of the inlet chamber 20 has a lower surface which provides a ceiling for the main structure of the nozzle 3. Formed below the upper floor 22 is an inner flange 23 projecting from the lower portion of the inner peripheral wall. Formed in the substantial height region of the inner peripheral wall 15 is vertical guide passages 24 for guiding the liquid coolant from the inlet chamber 20 into the area immediately above the inner flange 23. The inner flange 23 comprises a corridor for substantially radially flowing the liquid coolant thereinto through the inlet 24a formed to extend outward through the inner peripheral wall 15 from the lower end of the vertical guide passages 24, an intermediate peripheral wall 25 erected from the outer edge of said corridor for inwardly turning the said radially flowing liquid, and a turnaround ceiling plate 26 having an inner peripheral edge 26a opposed to the periphery of said inner peripheral wall 15, said inner flange supporting an inside channel limited in such turnaround sectional construction. This inside channel is the portion which initially imparts particulation and turbulence actions to the liquid coolant in the process of turning and upwardly directing the liquid coolant.

The ceiling defined by the lower surface of the upper floor 22 serves as a guide surface which causes the liquid coolant flowing out of the opening to flow in a planar radial manner above the ceiling plate 26, while the outer peripheral wall 17 serves as an outside guide surface for bending the planar radial flowing liquid downward to flow downward around the inner flange 23. The upper structure constructed by these guide surfaces cooperates with the outer wall surface of the inner flange 23 to form an outside channel. At least one place on one of the wall surfaces which form this outside channel, in this case, at the outer peripheral end of the ceiling, there is formed a circulatory groove 27 for disturbing the flow. As will be later described, the sectional shape of this circulatory groove is not limited to the illustrated rectangular shape, but it may be any recessed shape or uneven shape.

The outside channel terminates as a lower end at the upper step surface 19a of the lower frame wall 19 and connects to an inward channel on the flow guide floor comprising said surface 19a and inside step-down surface 19b. The lower surface of the inner flange 23 terminates in a position corresponding to an intermediate portion of the step-down surface 19b of the lower frame wall 19 and connects to the lower end 15c of the inner peripheral wall 15, said lower end having a somewhat reduced outer periphery. As shown, the lower surface of the inner flange 23 and the lower end 15c of the inner peripheral wall are respectively opposed to the upper step surface 19a and step-down surface 19b of the lower frame wall to limit the channel height, while the peripheral surface of the lower end 15c serves as an upper weir plate corresponding to the level difference 19a/19b of the lower frame wall to suppress the flow velocity of the inward flowing liquid.

The front end, i.e., inner peripheral end, of the step-down surface 19b of the lower frame wall, is a nozzle port 28 downwardly inclined toward the lowermost front edge (lowermost inner peripheral edge); functionally, it serves as a waterfall opening through which the liquid coolant flows downward. Defined above the nozzle port 28 is a sufficient space extending to the main shaft cover 16, so that there is no danger of the waterfall-like downward flow being impeded.

Figure 3:
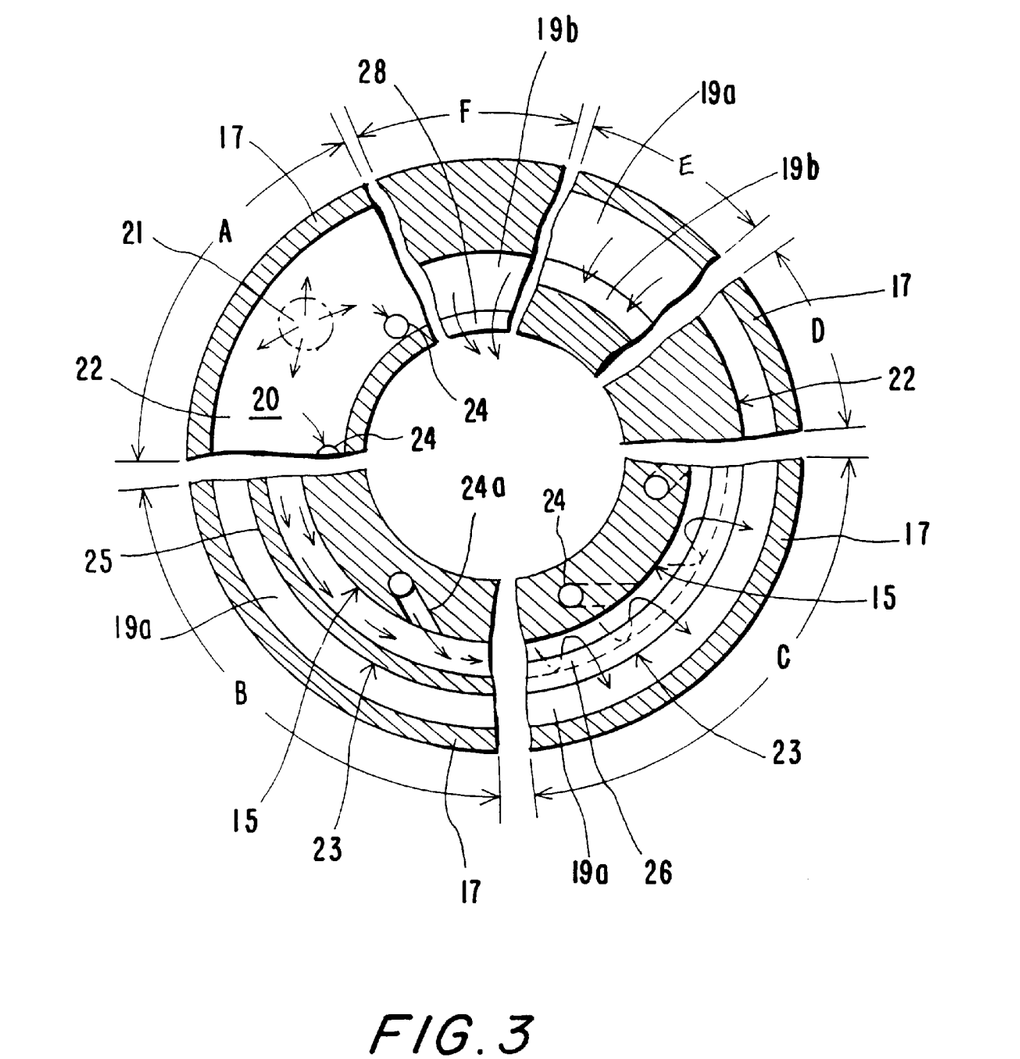
FIG. 3 is a combination of fragmentary sections taken along the lines A—A, B—B, C—C, D—D, E—E, and F—F in the fragmentary sectional view of FIG. 2.

FIG. 3 shows a combination of horizontal sections illustrating in order the flow of liquid coolant in an annular nozzle as described above. First, the section A shows how a liquid coolant entering the inlet chamber 20 through the inlet conduit 21 flows into one vertical guide passage 24 extending downward from the floor 22 of said chamber and moves downward. The section B shows how said liquid coolant flows out of the lower end of said vertical guide passage 24 and into the turbulence inlet 24a which in this case is twisted by an angle of about 60°, from which it flows into the inside channel (first turbulence forming region) in the intermediate peripheral wall 25 above the inner flange 23. The section C shows the manner in which the liquid coolant flowing upward from the first turbulence forming region flows from above the inner flange 23 through a second turbulence forming region in a sinuous path leading outward. The section D shows the presence of an upward turbulence forming pocket 27 located outside the second turbulence forming region. Thus, the liquid coolant made fully particulate and turbulent flows downward toward the upper step surface 19a of the lower frame wall through the outside channel between the outer peripheral wall 17 and the flange wall 25 shown in the section B. Further, as shown in the section E, it flows from the upper step surface 19a to the step-down surface 19b and, as described above, it strikes the lower end 15c of the inner peripheral wall (FIG. 2) above the step-down surface 19b and is thereby decelerated, flowing downward in a waterfall fashion through the nozzle port 28 as shown in the section F.

Figure 4:
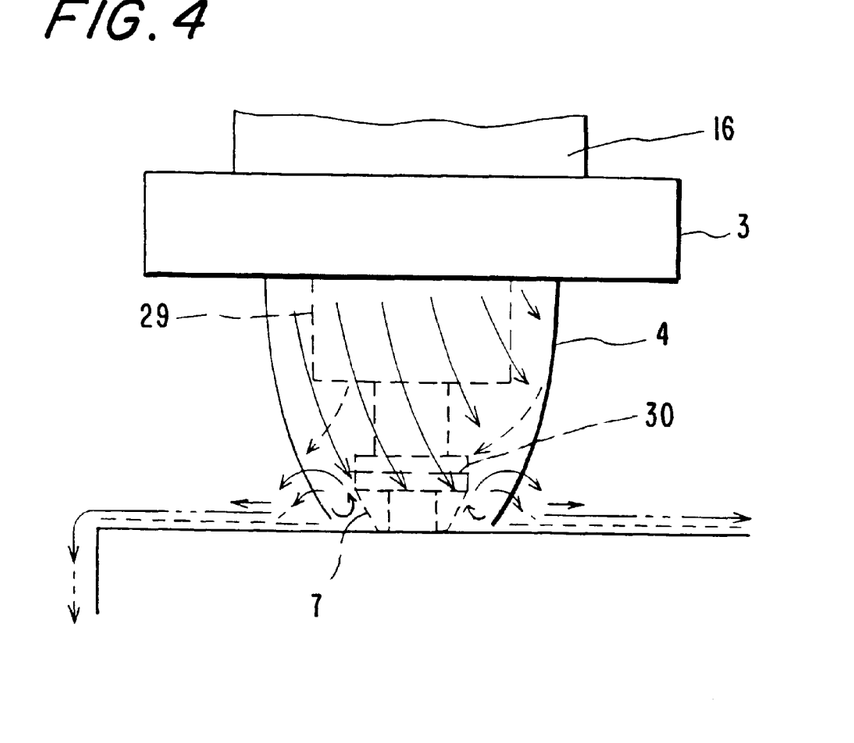
FIG. 4 is a schematic side view showing a cylindrical veil and a helical surface flow of liquid coolant coming out of the liquid coolant feed nozzle shown in FIGS. 2 and 3.
Figure 5:
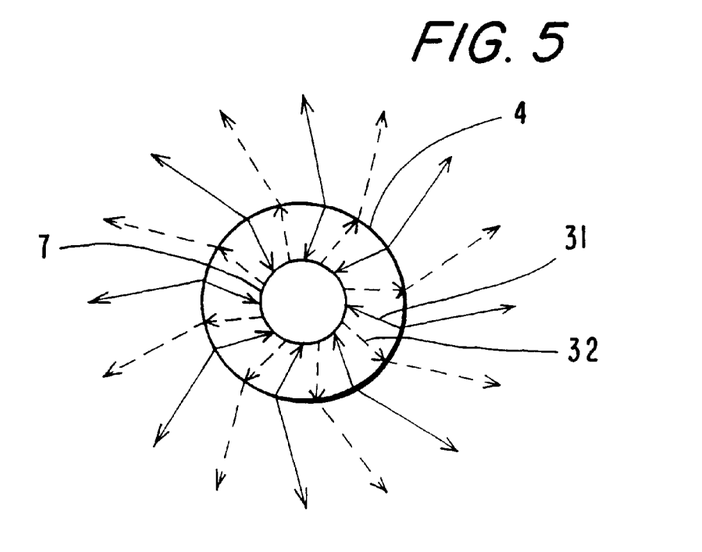
FIG. 5 is a schematic plan view showing the cylindrical veil and the surface flow on the surface of a workpiece shown in FIG. 4.

FIGS. 4 and 5 show in detail a substantially conical/surrounding veil 4 made of waterfall-like liquid coolant discharged from the annular nozzle shown in FIGS. 2 and 3, and the state of a weak helically and radially inward surface flow formed of the greater part of said surrounding veil. As shown in FIG. 4, even if the liquid coolant discharged as the surrounding veil 4 is discharged approximately directly downward from the nozzle port 28, it has its centrifugal force reduced by the function of decelerating the circulatory component by the lower end 15c of the inner peripheral wall (FIG. 2) when the liquid coolant is flowing inwardly along the flow guide floor having the level difference 19a/19b of said nozzle lower framework, and in the radially inward direction, it is subjected to a push-out action from the peripherally (rear) fluid just before the nozzle port 28, so that its diameter is gradually reduced toward the center during falling. This is remarkable the more, the greater the flow rate of the liquid coolant. Thus, as shown in FIG. 4, it falls along the periphery of a tool attachment 29 on the main shaft end, gradually changing its shape from a bowl to an inverted cone directly surrounding the tool 7.

The liquid coolant striking the surface of the workpiece 5 at such inward angle mostly moves toward the central region according to the angle of incidence to said surface and forms a central liquid layer 30 surrounding the lower portion of the main body of the tool 7. Therefore, the point of pressure contact between the cutting edge and the workpiece is immersed in this central liquid layer 30, so that chips produced therefrom are floated by the liquid movement in the liquid layer and carried away from the liquid veil 4. In FIG. 5, a liquid flow 31 moving from the liquid veil 4 toward the center is indicated in solid lines, and a liquid flow 32 moving out of the liquid veil 4 after contacting the tool 7 and floating is indicated in broken lines. In addition, inside the liquid veil 4, the radially inward flow 31 shown in solid lines is opposite in direction to the radial flow 32 shown in broken lines. However, since the flow of liquid coolant has been made fully particulate when passing through the turbulence forming regions located at two places in the nozzle, as described above, it is presumed that the latter 32 turns around as if sliding over the layer of the former 31, thus forming a turnaround flow flux. In addition, since the liquid coolant is a relatively thick-walled flow, there is no drawback that, as in the conventional nozzle, the liquid coolant strikes the cutting edge of the tool 7 and is bounded back while leaving the chips behind to allow them to cut into the portion being machined.

Figure 6:
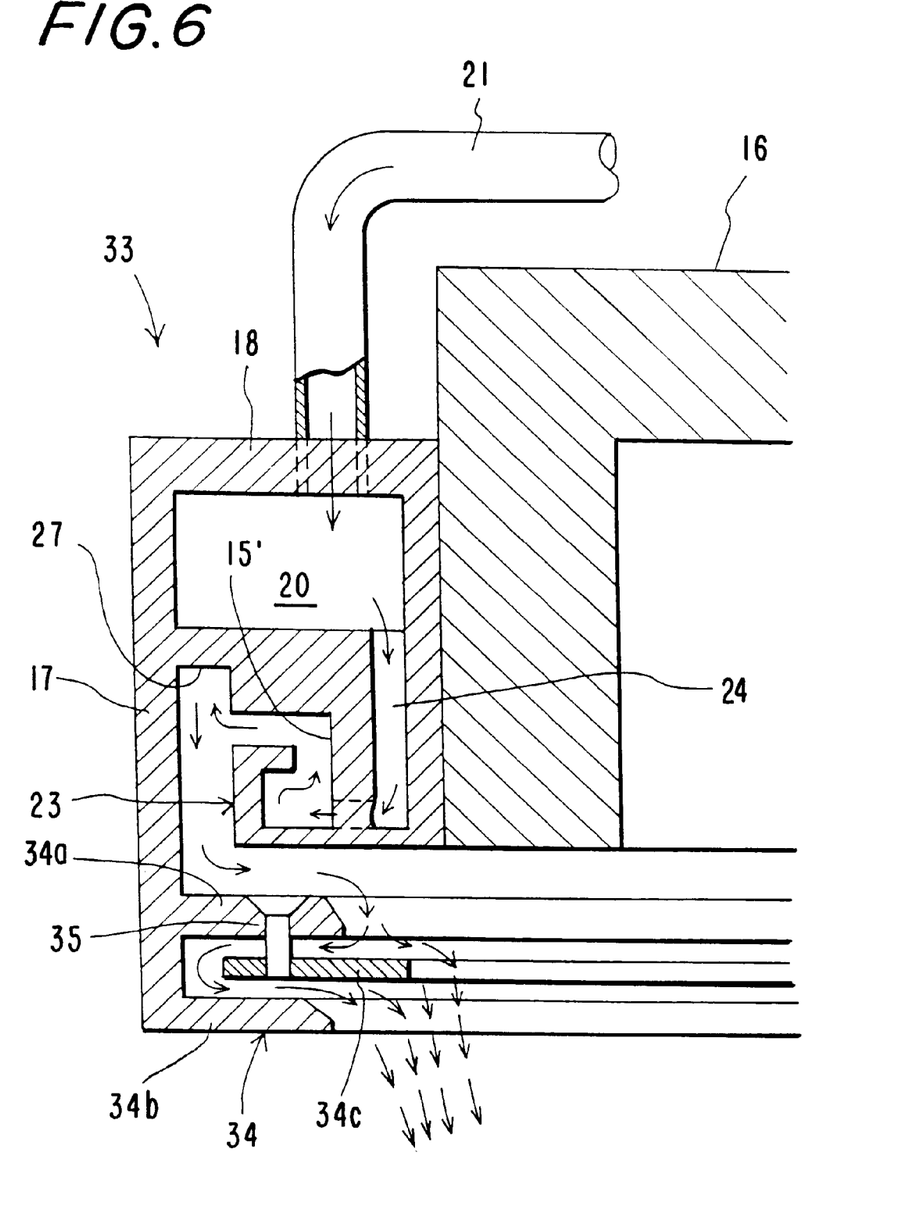
FIG. 6 is a fragmental sectional view showing the sectional construction of a liquid coolant nozzle according to a second embodiment of the present invention.

FIG. 6 is a fragmentary sectional view showing an annular nozzle according to another embodiment. This annular nozzle 33 is the same in construction as the nozzle 3 shown in FIGS. 2 and 3 except that the lower framework 34 is of the multistep type and that the lower end of the inner peripheral wall 15' is flush with the lower end of the inner flange 23. This lower framework 34 comprises a shelf-like upper step portion 34a radially inwardly projecting from the lower end of the outer peripheral wall 17 and converging, a shelf-like lower step portion 34b likewise radially inwardly projecting and spaced downward from said upper step portion 34a and converging, and an intermediate plate 34c comprising an outer peripheral portion positioned in a spacing between said upper and lower step portions 34a and 34b and an inner peripheral portion projecting from said spacing and converging. This intermediate plate 34c is an independent annular plate and suspended from the upper step portion 34a as by flat head screws 35.

The lower framework 34 serving as a channel guide floor forms a first level difference by a fall from the inner peripheral edge of the upper step portion 34a to the intermediate plate 34c, a second level difference by a fall from the outer peripheral edge of the intermediate plate 34c to the lower step portion 34b, and a first circulatory waterfall opening by the inner peripheral edge of the intermediate plate 34c, and uses said lower step portion 34b as a flow guide floor for the liquid coolant turned around inwardly from said second level difference, and the inner terminal edge thereof as a second circulatory waterfall opening positioned somewhat more outward than said first circulatory waterfall opening.

In the nozzle 33 having such lower framework 34, of the liquid coolant falling from the inner peripheral edge of the upper step portion 34a onto the intermediate plate 34c via the first level difference, the portion which maintains the centrifugal force flows outward on said plate 34c, past the outer peripheral end along the inner side of the outer peripheral wall 17 to fall onto the lower step plate 34b and then turns around inwardly. On the other hand, of the liquid coolant falling onto the intermediate plate 34c, the portion which flows inward and downward in the form of a waterfall from the inner terminal end of the intermediate plate 34c as the first waterfall opening or a nozzle port. Further, since the inner terminal end of the lower step portion 34b terminates in radial position short of the inner end of the intermediate plate 34c, it forms a nozzle port of larger diameter, through which the liquid coolant also flows downward like a waterfall. When this outside downflow portion changes its course to the inward direction as it bypasses the outer peripheral end of the intermediate plate 34c, it consumes its centrifugal force and is rather accelerated inwardly; therefore, after the liquid coolant has become the waterfall-like downflow veil, the action to reduce the diameter of the veil cross-section is stronger. Therefore, the nozzle 33 of this embodiment has a greater ability to converge the inverted cone of liquid coolant than the nozzle 3 in the fundamental embodiment.

Figure 7:
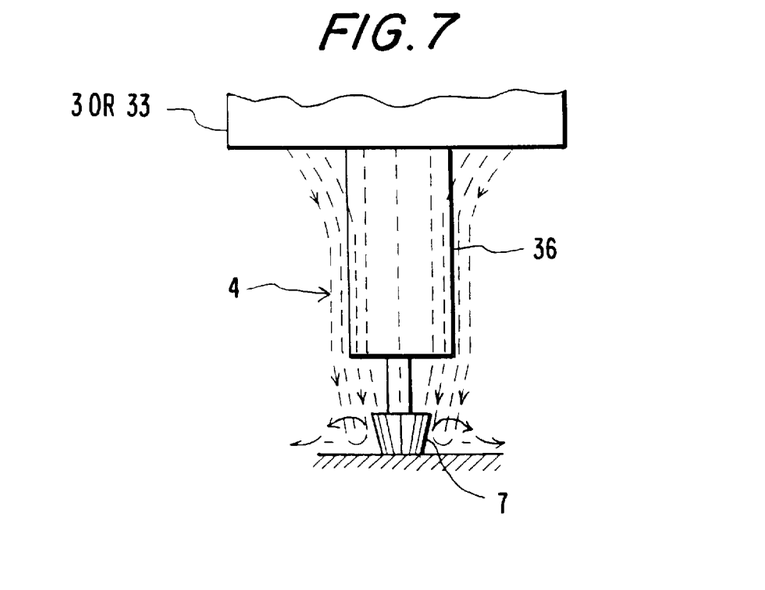
FIG. 7 is a schematic front view showing an embodiment wherein a longer quill is positioned between a nozzle for discharging a coolant veil, and a tool/workpiece contact place.

FIG. 7 shows what behavior the surrounding veil of liquid coolant from the nozzle exhibits in the case where a relatively long quill 36 protrusively holding the tool 7 is protruded itself from the nozzle by a significant length e.g., 600 mm, without the direct facing of the nozzle 3 or 33 having an internal structure as shown in FIG. 2, 3 or 6, to the workpiece as shown in FIGS. 1 and 4. In this case, the surrounding veil 4 of liquid coolant strikes against the middle cylindrical surface of the quill 36 by converging into a substantial inverted conical form, and downwardly flows along the cylindrical surface, surroundingly. The downward flow of liquid coolant substantially maintains its finely particle-like turbulency and concentrically surrounding capability, even it has fallen out of the lower end of the quill 40 to rush into the space in just front of the contact place of the tool with the workpiece. It is confirmed therefore, that the flow of the coolant liquid is efficiently supplied to the contact place of the tool with the workpiece. It is predicted that the protruded length of the quill 36 from the nozzle is allowable up to 1–1.5 mm. As a result, the invention is applicable to the quill-supplement system as described above to effectively machine for various products, such as a product having a deep hole.

Figure 8A:
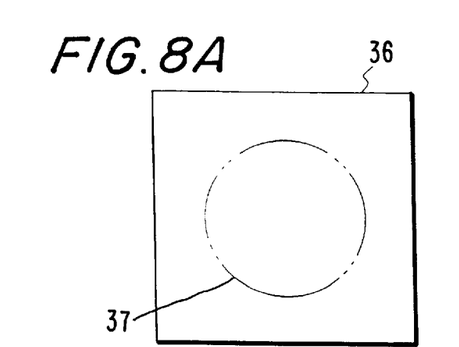
FIGS. 8A, 8B and 8C are schematic plan views showing the relation between the outer shapes and the nozzle ports of various frame type liquid coolant nozzles.
Figure 8B:
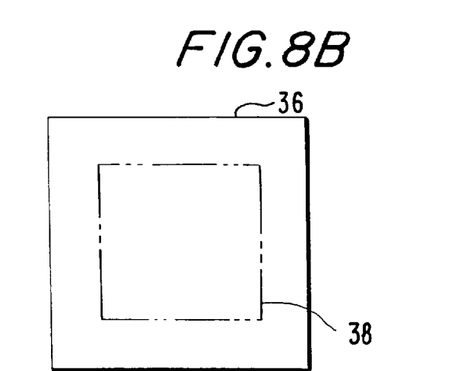
Figure 8C:
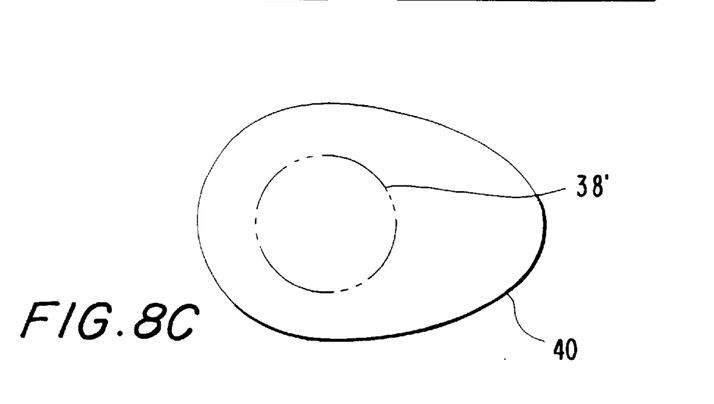

FIGS. 8 A and B show two forms in which the internal nozzle construction shown in FIGS. 2, 3 and 6 is build in similar figures within a square frame 37; one in which the final nozzle port alone is in the form of a circle 38, and the other in which it still has a similar square 39. Test results have shown that if a waterfall-like surrounding veil of liquid coolant is allowed, in a suitable amount, to sufficiently converge toward a workpiece, the cooling, lubricating and chip recovering effects, and hence improvements in machining accuracy and rate, and cutter life, etc., are substantially the same as in the annular nozzle described above. Further, the modification of a nozzle shown in FIG. 8C comprises an oval frame 40, an inner structure of the substantially similar form to the frame 40 therein, and a final nozzle port of the frame in circular form 38'. From this modification, substantially the same effect as the annular nozzle is also obtained. Therefore, it is considered as to a generally elliptic frame again to have the same effect.

FIG. 9 shows examples in which in the annular and square frame nozzles described above, mainly the second turbulence forming portion in the sectional constructions shown in FIGS. 2 and 6 are variously modified. In a modification A, the ceiling above the inner flange 23 is formed with triangular undulating ridges 27a in lieu of the flow agitating circulatory groove, i.e., the recess 27 of rectangular cross-section (FIGS. 2 and 6)in the preceding embodiment. In a modification B, the ceiling is formed with a recess 27b similar to the recess 27 in an intermediate position short of the outer peripheral wall 17. In a modification C, the ceiling is formed with a recess 27c positioned in contact with the inner peripheral wall 15.

Figures 9A, 9B:
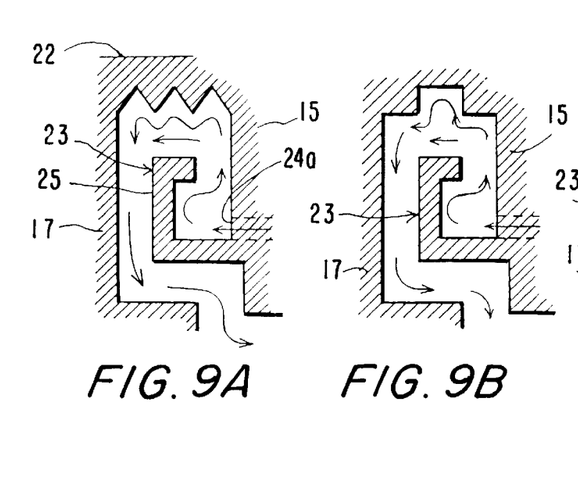
FIGS. 9A, 9B, 9C, 9D, 9E and 9F arecomprises fragmentary sectional views showing various embodiments of the inside and outside channels of the liquid coolant nozzle in the first and second embodiments.
Figure 9C:
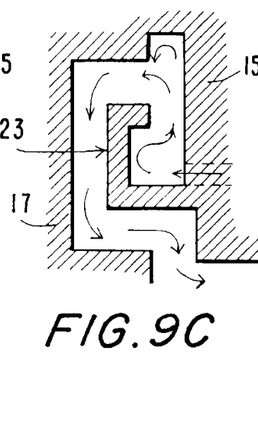
Figure 9D:
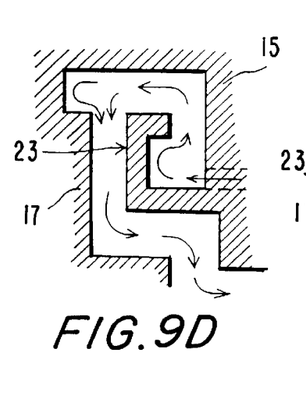
Figures 9E, 9F:
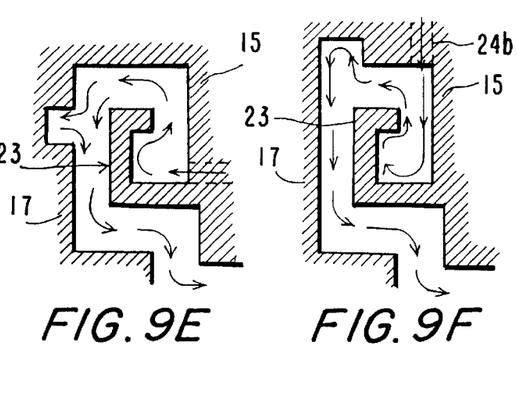

In a modification D, the upper end of the outer peripheral wall 17 is formed with a recess 27d, and in a modification E, a recess 27e is formed in a position which is somewhat below the level of the upper end of the outer peripheral wall 17. Further, in a modification F, the position of a recess 27 is the same as in the fundamental embodiment, and the liquid coolant inlet to the space above the inner flange 23 is provided by the lower end 24b of the vertical guide passage 24, opening to the ceiling above the inner flange 23.

In the modifications A–E described above, the flow agitating recesses have been varied in position and cross-sectional shape but have been observed to produce the same flow agitating effect so long as they are formed in the ceiling which is the back of the upper floor 22 or in the inner surface of the outer peripheral wall and with substantially the same recess depth and volume as in said circulatory groove 27. It is considered by analogy with this that the same effect would be obtained even when a recess is formed in the peripheral wall (intermediate peripheral wall 25 of the inner flange 23. Further, in the case where the liquid coolant inlet opens above the inner flange 23 as in the modification F, this arrangement is capable of meeting the limitation which does not allow the thickness of the inner peripheral portion to be increased from the viewpoint of nozzle design though the turbulence forming effect is somewhat decreased.

The effects and possibilities found in the embodiments of the present invention described above are as follows.

① In the second turbulence forming portion, the formation of a recess in the ceiling above the inner flange (1"27" in FIGS. 2 and 6) accelerates the process of making turbulent/particulate the liquid coolant passing the first turbulence forming portion ("23" in FIGS. 2 and 6) in the inner flange, so that even if the liquid coolant falls like a waterfall from the nozzle port, it is possible to form a relatively less scattering, less oscillating, well-flowable, stabilized tool surrounding flow.

② The step construction of the final flow guide floor of the nozzle decreases the centrifugal force on the liquid coolant at a place short of the nozzle port but increases the radially inward force thereon, with the result that it becomes possible to constrict the liquid coolant veil formed by falling like a waterfall into a concentrated conical form having a height of up to about 700–800 mm and apply it to long tools, such as end mills and drills, or use this construction for a ram head.

③ Generally, increasing the flow rate by controlling the liquid coolant supply from the nozzle head increases the inverted cone constriction effect and also the chip floating effect when the thickness of the flow liquid layer surrounding the tool end is 40–50 mm or more. The applicable range of flow rate is about 60–100 l/min, and in an automatic machine the flow rate can be switched between a large flow rate high speed machining operation and a normal flow rate common machining operation by a switching valve.

④ The term "high speed machining" refers to workpiece feed speed (table moving speed) of about 10 m/min–20 m/min at a tool rotation linear speed of 900–1,000 m/min. In my machining experiments using nozzles of the fundamental form shown in FIGS. 2 and 3, sufficient machining accuracy and cooling effect were obtained with a machining speed of 1,000 m/min and a feed speed of 15 m/min. Further, such great feed speed per cutter leads to increased productivity.

In the case of an end mill roughing tool, heavy cutting capability of the roughing tool is insured in high speed tool-revolution of about 80–100 m/min in linear velocity in which super hard tools are generally used, and capable of elongating the feeding pitch of one cutting blade and the depth of cutting.

⑤ The reason why improved machinability as mentioned above is obtained is nothing but that the system for feeding a liquid coolant to the cutter tip by the nozzle of the invention produces excellent cooling and lubricating effects. As to the cooling effect, even those heat-accumulatable tooling, such as drill-tooling, the surface of a workpiece which has just been machined, is touchable by a human hand, without any feeling of hotness. In addition, as to the improvement of lubricating effect, it is not necessary to substantially ensure the lubrication by controlling the composition of the liquid coolant itself, by the liquid coolant particularly being fed to the region of pressure contact between the cutting edge and a workpiece without being splashed.

Thereby it is possible to use a composition of coolant consisting of water and a rust-preventive agent alone without including a lubricating agent harmful to the environment. Thus, if it is coupled with the effect of using the liquid coolant separating and recovering pump 11 described in the aforesaid international application (PCT/JP/97/00373), the invention makes disposal of waste liquid unnecessary for a length of time of 5 years.

⑥ Since the configuration of the nozzle of the present invention is not only annular or square and symmetrical with respect to its axis but ellipse or semicircle, it can be constructed as an attachment type adapting for various tool holders and tool driving members and can be exchangeably attached to a main shaft cover or machining center. Because of its nature capable of forming a well-flowable stabilized tool-surrounding flow with no spattering and little oscillation, even a five-plane machine can be coped with by a surrounding veil of liquid coolant applied from above.

⑦ As a special manner of use, the nozzle can be with a deep cutting machine or a lathe while enhancing the effect of removing chips and water.

⑧ Generally, the 2-step compound flowing floor type shown in FIG. 6 provides a greater effect of constricting the inverted cone, less spattering of liquid coolant, and greater cuttability than the fundamental type shown in FIGS. 2 and 3.

For example, material SS400 was successfully machined at high speed, specifically at a machining speed of 2,500 mm/min and a feed rate of 90–100 m/min using a high speed steel end mill (φ25) using this compound flowing floor type nozzle, and at a machining speed of 1,200 mm/min and a feed rate of 800 mm/min using a drill (φ22).

Figure 10:
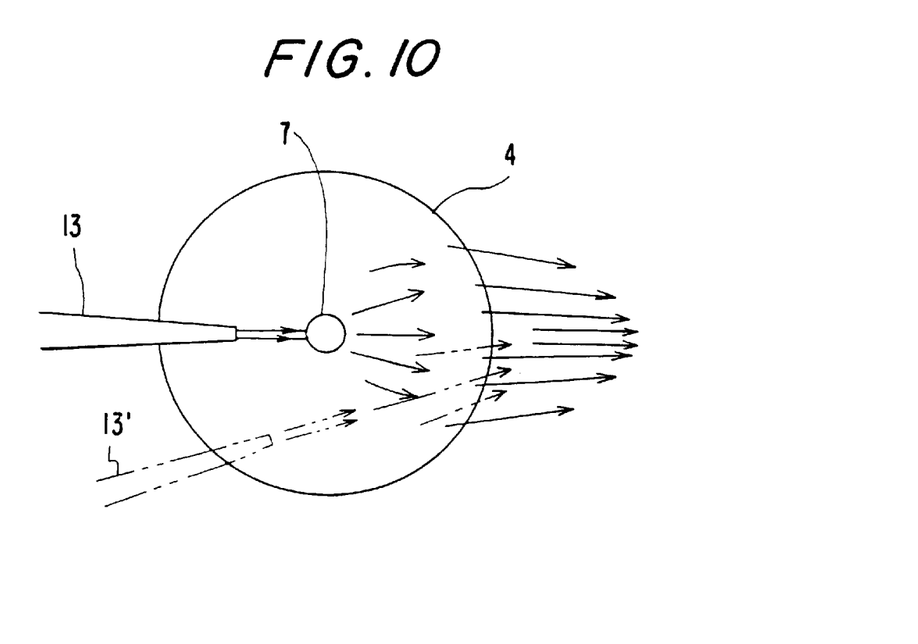
FIG. 10 is a schematic plan view showing the state of typical usage of an auxiliary liquid coolant nozzle shown in FIG. 1.

⑨ The discharge port of the auxiliary nozzle 13 shown in FIG. 1 should be positioned in relation to the size of the surrounding veil and the volume of chips. If the diameter of the lower end of the surrounding veil of liquid coolant is sufficiently large, the auxiliary nozzle may be inserted into the veil 4, as shown in FIG. 10. In this case, the nozzle 13 can not only be positioned to directly jet to the portion just below the tool 7 as shown by solid lines, but positioned to digressively jet through a by-road out of the tool 7 as shown by imaginary lines as a nozzle 13'. Thus, the drain flow discharged upon completion of the action of the continuously fed veil 4 is regulated as shown at 4a and discharged and removed without chips stagnating therein.

Figures 11A, 11B:
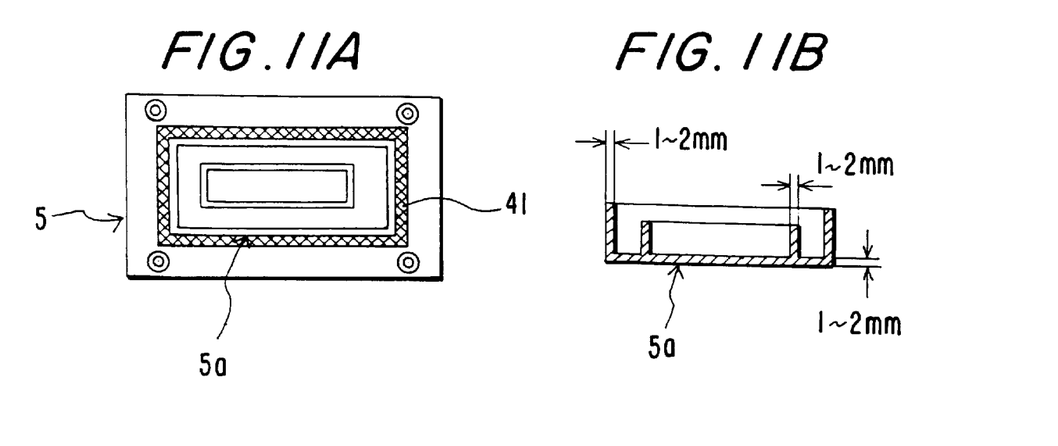

⑩ Feeding a suitable liquid coolant using the nozzle construction of the present invention will minimize strain in the workpiece, so that a metal workpiece 5 shown in FIG. 11A may be machined into a thin product 5a having walls and a bottom plate of 1–2 mm thickness by cutting out a peripheral slot 41 and taking out it therefrom as a unit as shown in FIG. 11B. It is ascertained that the unit product 5a has not at all deformed.

INDUSTRIAL APPLICABILITY

The present invention provides a nozzle construction arranged in the manner described above which effects liquid coolant feeding ensuring excellent lubrication and cooling, and good discharging characteristic of chips, making it possible to perform a high speed, high precision cutting or lathing operation while feeding a liquid coolant which flows smoothly. The machining rate can be increased to a value 3–7 times, preferably a value 5–25 times in the case of an end mill machine as high as in the case of using a conventional nozzle; thus, the economic effect brought about thereby is very great. Further, a reduction in the cost of cutting oil and a large reduction in the cost for washing the tank and treating the drained waste can be expected; thus, the invention provides immeasurable effects in increase of efficiency, abatement of environmental pollution, labor saving, etc. Further, typically, a mixture of water and rust-preventive agent alone may be used as a liquid coolant to perform cutting operation.

I claim:

1. A nozzle for liquid coolant in a machine tool in the form of an annular or polygonal frame-like nozzle for liquid coolant disposed above a machining tool, connected to a vertical main shaft such that the nozzle is coaxial with said main shaft and directed downward, comprising;

a) an inner peripheral wall, b) an inner flange for inside channel support comprising a corridor block for allowing a liquid coolant flowing in through an inlet port formed directly in or close to said inner peripheral wall to flow substantially radially, an intermediate peripheral wall extending upright from the outer edge of said corridor block so as to cause the radially flowing liquid to turn around inward, and a turnaround top plate having an inner peripheral edge opposed to the periphery of said inner peripheral wall to define an opening to allow said inwardly turned-around flowing liquid to flow out upward through said opening along said inner peripheral wall, c) an upper framework which comprises a ceiling formed above said top plate to serve as a guide surface for allowing the liquid coolant flowing out upward through said opening to flow in a planar radial manner, and an outer peripheral wall serving as an outside guide surface for downwardly bending said planar radial flowing liquid to allow the latter to flow downward around the periphery of said flange, and which cooperates with the outer wall surface of said flange to define an outside channel, wherein the wall surface which forms the outside channel is formed in at least one place thereon with a flow agitating recess or a ridge/recess combination, and d) a lower framework which includes outer and inner peripheral edges connected to the lower end of said outer peripheral wall positioned below said inner flange, and at least one level difference present intermediate between said inner and outer peripheral edges, and which forms a flow guide floor by which the liquid coolant reaching the lower end of said outer peripheral wall is guided radially inward through said level difference, e) the arrangement being such that the liquid coolant is allowed to flow downward with the inner peripheral edge of said flow guide floor defining a circulatory waterfall opening, thereby forming a cylindrical or downwardly tapering conical waterfall-like liquid coolant veil surrounding said cutter.

2. A nozzle for liquid coolant as set forth in claim 1, characterized in that the inlet port formed directly in or close to said inner peripheral wall is adapted to discharge the liquid coolant along the corridor block of said radial bracket, not in a purely radial manner but with a predetermined transverse twist angle.

3. A nozzle for liquid coolant as set forth in claim 1, characterized in that said flow agitating recess or ridge/recess combination is formed in at least one place on said ceiling or outer peripheral wall of said upper framework.

4. A nozzle for liquid coolant as set forth in claim 1, characterized in that the root portion of the back of said inner flange is formed as a depending block corresponding to the at least one level difference of said flow guide floor, said depending block being adapted to serve as an upper weir which causes forced falling of the radially inward liquid coolant flow past said level difference.

5. A nozzle for liquid coolant as set forth in claim 1, characterized in that the flow guide floor of said lower framework comprises an upper step portion radially inwardly projecting from the lower end edge of said outer peripheral wall and converging, a lower step portion radially inwardly projecting and converging and spaced downward from said upper step portion, and an intermediate plate comprising an outer peripheral portion disposed in a spacing between said upper and lower step portions and an inner peripheral portion projecting from said spacing and converging, wherein a first level difference is defined by a fall extending from the inner peripheral end edge of said upper step portion to said intermediate plate, while a second level difference is defined by a fall extending from the outer peripheral end edge of said intermediate plate to said lower step portion, the inner peripheral end edge of said intermediate plate defining a first circulatory waterfall opening, said lower step portion being adapted to serve as a flow guide floor for the liquid coolant flow which is turned around inwardly from said second level difference, the inner terminal end edge thereof being used to define a second circulatory waterfall opening positioned somewhat outwardly of said first circulatory waterfall opening.

* * * * *